US009491731B2

United States Patent
Shi et al.

(10) Patent No.: US 9,491,731 B2
(45) Date of Patent: Nov. 8, 2016

(54) POSITIONING IN A CELLULAR COMMUNICATION NETWORK

(75) Inventors: Liang Shi, Shanghai (CN); Bin He, Shanghai (CN); Linjiang Li, Shanghai (CN); Zhongqiu Lin, Shanghai (CN); Aijun Yu, Shanghai (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 214 days.

(21) Appl. No.: 14/111,524

(22) PCT Filed: Apr. 13, 2011

(86) PCT No.: PCT/CN2011/000646
§ 371 (c)(1),
(2), (4) Date: Oct. 11, 2013

(87) PCT Pub. No.: WO2012/139250
PCT Pub. Date: Oct. 18, 2012

(65) Prior Publication Data
US 2014/0038639 A1    Feb. 6, 2014

(51) Int. Cl.
H04W 64/00    (2009.01)
G01S 5/02     (2010.01)

(52) U.S. Cl.
CPC ............... H04W 64/00 (2013.01); G01S 5/02 (2013.01); G01S 5/0252 (2013.01)

(58) Field of Classification Search
CPC ... H04W 64/00; H04W 8/005; H04W 48/04; G01S 5/0252; G01S 5/00
See application file for complete search history.

(56) References Cited

U.S. PATENT DOCUMENTS

| 7,945,271 B1 * | 5/2011 | Barnes | H04W 64/00 455/115.3 |
| 8,406,787 B2 * | 3/2013 | Kangas et al. | 455/456.1 |
| 8,666,430 B2 * | 3/2014 | Wigren et al. | 455/456.1 |
| 2007/0019586 A1 * | 1/2007 | Nanda | H04W 48/16 370/335 |

(Continued)

FOREIGN PATENT DOCUMENTS

| CN | 1744763 | 3/2006 |
| CN | 101772156 | 7/2010 |
| CN | 101778399 | 7/2010 |

OTHER PUBLICATIONS

Notification Concerning Transmittal of the International Preliminary Report on Patentability (Chapter 1 of the PCT) for PCT Counterpart Application No. PCT/CN2011/000646, (Oct. 24, 2013), 5 pages.
International Search Report for PCT Counterpart Application No. PCT/CN2011/000646, (Jan. 19, 2012), 2 pages.

(Continued)

Primary Examiner — Brandon Miller
(74) Attorney, Agent, or Firm — Patents on Demand, P.A.; Brian K. Buchheit; Scott M. Garrett

(57) ABSTRACT

A method for positioning in a communication network with a cellular coverage is disclosed, wherein comprising the following steps: receiving location-dependent data concerning a mobile device; from a plurality of fingerprints, each of which corresponds to one of locations within the coverage, retrieving one having the highest similarity to the location-dependent data; and determining the location corresponding to the fingerprint with the highest similarity as the mobile device's location if the highest similarity exceeds a predetermined threshold.

20 Claims, 6 Drawing Sheets

(56) References Cited

U.S. PATENT DOCUMENTS

2007/0060130 A1* 3/2007 Gogic .................. G01S 5/0252
455/440
2011/0012781 A1* 1/2011 Ronald et al. ........... 342/357.25
2011/0124347 A1* 5/2011 Chen et al. ................ 455/456.1

OTHER PUBLICATIONS

Wigren, Torbjörn, "Adaptive Enhanced Cell-ID Fingerprinting Localization by Clustering of Precise Position Measurements," *IEEE Transactions on Vehicular Technology,* 56(65), (Sep. 2007), 12 pages.

* cited by examiner

POSITIONING IN A CELLULAR COMMUNICATION NETWORK

CROSS-REFERENCE TO RELATED APPLICATIONS

This application is a National stage of International Application No. PCT/CN2011/000646, filed Apr. 13, 2011, which is hereby incorporated by reference.

TECHNICAL FIELD

The present invention generally relates to positioning in a cellular communication network. More specifically, and in various embodiments, the present invention relates to improvements on fingerprinting localization in a cellular communication network.

BACKGROUND

A location-based service (LBS) is an information or entertainment service, accessible with mobile devices through a cellular communication network or a mobile network and utilizing the ability to make use of the geographical position of the mobile devices. In LBS, a location of a person or object, such as the nearest banking cash machine or the whereabouts of a friend or employee, is identified.

The basic positioning method in most cellular communication systems is the cell identity (cell ID) method, which relies on various means of multilateration of the signal from cell sites serving a mobile phone. This method is applicable if there is a cellular coverage. Different attempts have been made to enhance the accuracy of the cell ID positioning method. Among them, fingerprinting positioning is a very active field currently.

Typically, in the fingerprinting positioning, radio measurements from multiple base stations (e.g., signal strength or path loss measurements) are utilized to provide a "fingerprint" of the radio conditions at a specific geographical position. The position can be exactly determined by some kinds of reference position measurement, e.g., using differential GPS or manual mapping. In this way, a reference map or database is created, and thus the position of a mobile device or terminal can be retrieved therefrom if the real radio conditions have been obtained by measurements.

In the fingerprinting positioning, it assumes that the radio environment or conditions are stable or time-independent. Therefore, for any location, the same radio condition is always expected to be obtained by different mobile devices. However, in the real world, this assumption is doubtful and indeed, the environment often changes in time violently. For example, some researches show that in a cellular network, e.g., a GSM network, different serving cells and neighbor cell are often assigned to the same location at different times. So is the measured signal strength of the serving cells and/or the neighbor cells, with the extreme case where the change could be as large as 30 db. Apparently, such change will result in failure of retrieval or an inaccurate positioning.

SUMMARY OF THE INVENTION

It is the object of the present invention to obviate at least some of the above disadvantages and to provide an improved solution for positioning in a cellular communication network.

According to one aspect of the invention, a method for positioning in a communication network with a cellular coverage comprises the following steps: receiving location-dependent data concerning a mobile device; from a plurality of fingerprints, each of which corresponds to one of locations within the coverage, retrieving one having the highest similarity to the location-dependent data; and determining the location corresponding to the fingerprint with the highest similarity as the mobile device's location if the highest similarity exceeds a predetermined threshold.

In a preferred embodiment according to the present invention, wherein the location-dependent data includes a list of cells heard at the mobile device and/or signal strength of the heard cells obtained at the mobile device, and each of the fingerprints includes a list of one or more cells corresponding to one of the locations within the coverage and/or signal strength of the cells in the list obtained at one of the locations.

In another preferred embodiment according to the present invention, wherein the location-dependent data and the fingerprints are represented in a multi-dimension vector space, and the similarity is a measurement on coincidence between a vector for the location-dependent data and a vector for one of the fingerprints.

According to another aspect of the present invention, an apparatus for positioning in a communication network with a cellular coverage comprises: a communication interface operable to receive location-dependent data concerning a mobile device; a database operable to store a plurality of fingerprints, each of which corresponds to one of locations within the coverage; and a processor operable to retrieve one having the highest similarity to the location-dependent data from the plurality of fingerprints, and to determine the location corresponding to the fingerprint with the highest similarity as the mobile device's location if the highest similarity exceeds a predetermined threshold.

According to still another aspect of the present invention, an apparatus for positioning in a communication network with a cellular coverage may comprises: a communication interface operable to receive location-dependent data concerning a mobile device; and a processor operable to access a database for storing a plurality of fingerprints, each of which corresponds to one of locations within the coverage, to retrieve one having the highest similarity to the location-dependent data from the plurality of fingerprints, and to determine the location corresponding to the fingerprint with the highest similarity as the mobile device's location if the highest similarity exceeds a predetermined threshold.

There also provides a computer program product adapted to carry out the method as described above when run on a computer and a computer readable medium comprising computer executable program code adapted to carry out the steps in the method as described above.

BRIEF DESCRIPTION OF THE DRAWINGS

The foregoing and other objects, features, and advantages of the invention will be apparent from the following more particular description of preferred embodiments as illustrated in the accompanying drawings in which.

DETAILED DESCRIPTION

Figure 1:
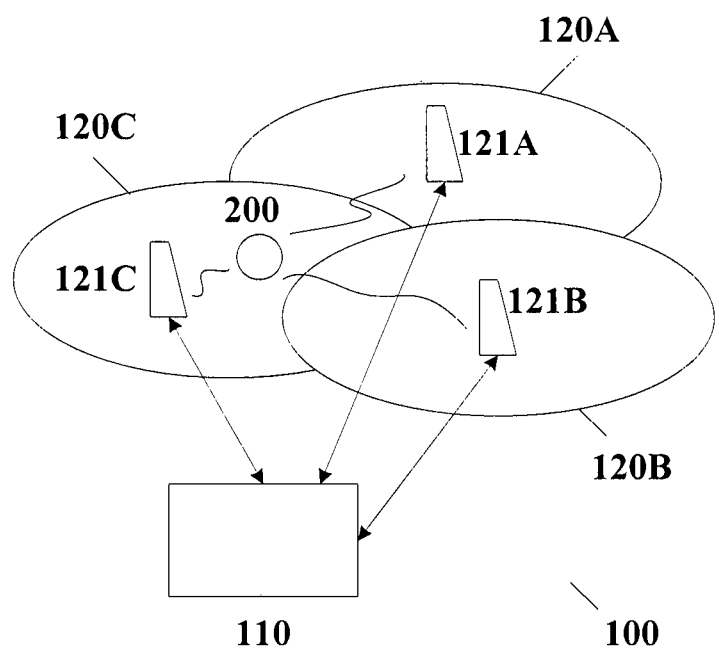
FIG. 1 shows a schematic cellular communication network.

While the invention covers various modifications and alternative constructions, embodiments of the invention are shown in the drawings and will hereinafter be described in detail. However it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

Moreover, it should be understood that the present invention is applicable to any cellular communication systems, such as GSM system, WCDMA system, CDMA2000 system and TD-CDMA system, where a geographical area is divided into a plurality of portions or cells.

FIG. 1 shows a schematic cellular communication network. For illustrative purpose, three wireless areas or cells 120A-120C, which are formed or serviced by base stations 121A-121C respectively, are shown in a cellular communication network 100. A mobile device 200 can communicate with the base stations 121A-121C via air interface. It can be any kind of terminals having connectivity with the base stations, including but not limited to cellular phones, mobile phones, PDAs, portable computers and the like. In this illustrative embodiment, positioning functionality is performed at a node 110 (referring to as "positioning node" hereinafter), which may be any kind of network entities in a radio access network or a core network.

As described above, the fingerprinting positioning requires the knowledge on relationship between fingerprints and locations. In the present invention, the term "fingerprint" refers to anything characterizing the radio conditions at one location. For example, it may include but is not limited to at least one of the following characteristics: serving cell, neighbor cell list, the signal strength of the cells measured at the location, Timing Advance (TA, in the context of GSM network or LTE network), Round Trip Time (RTT, in the context of WCDMA network) etc.

In one embodiment according to the present invention, a fingerprint corresponds to one location and can includes the following characteristics at that location: a predetermined serving cell, denoted as Serving Cell ID, a predetermined neighbor cell list, and the signal strength of the predetermined serving cell and the cells in the predetermined neighbor cell list. In a further embodiment, the predetermined serving cell and the predetermined neighbor cell list are merged into a single list.

The fingerprints may be indexed with the Serving Cell ID and have a hierarchical structure. Following is an illustrative example where the characteristics of each location are arranged at three layers corresponding to increasing accuracy levels:

Layer 1: Serving Cell ID (low accuracy level)

Layer 2: Serving Cell ID+Neighbor Cell List (medium accuracy level)

Layer 3: Serving Cell ID+Neighbor Cell List+signal strength (high accuracy level)

The retrieval may be carried out at Layer 1, 2 or 3 depending on what positioning accuracy is required. Alternatively, the retrieval may begin at Layer 3 and will proceed to the next layer if no match item is retrieved at the current layer.

In one embodiment of the present invention, the radio signal strength is represented in a discrete form. In other words, the strength is mapped or quantized into several quantized values, for instance, low, medium and high values.

In a typical GSM network, the signal strength varies in a range from 0 to 63 dB. Table 1 as below is an example of the signal strength quantization:

TABLE 1

| Signal Strength | Quantized Value |
| --- | --- |
| 0-20 | 0 |
| 21-40 | 1 |
| 41-63 | 2 |

Figure 2:
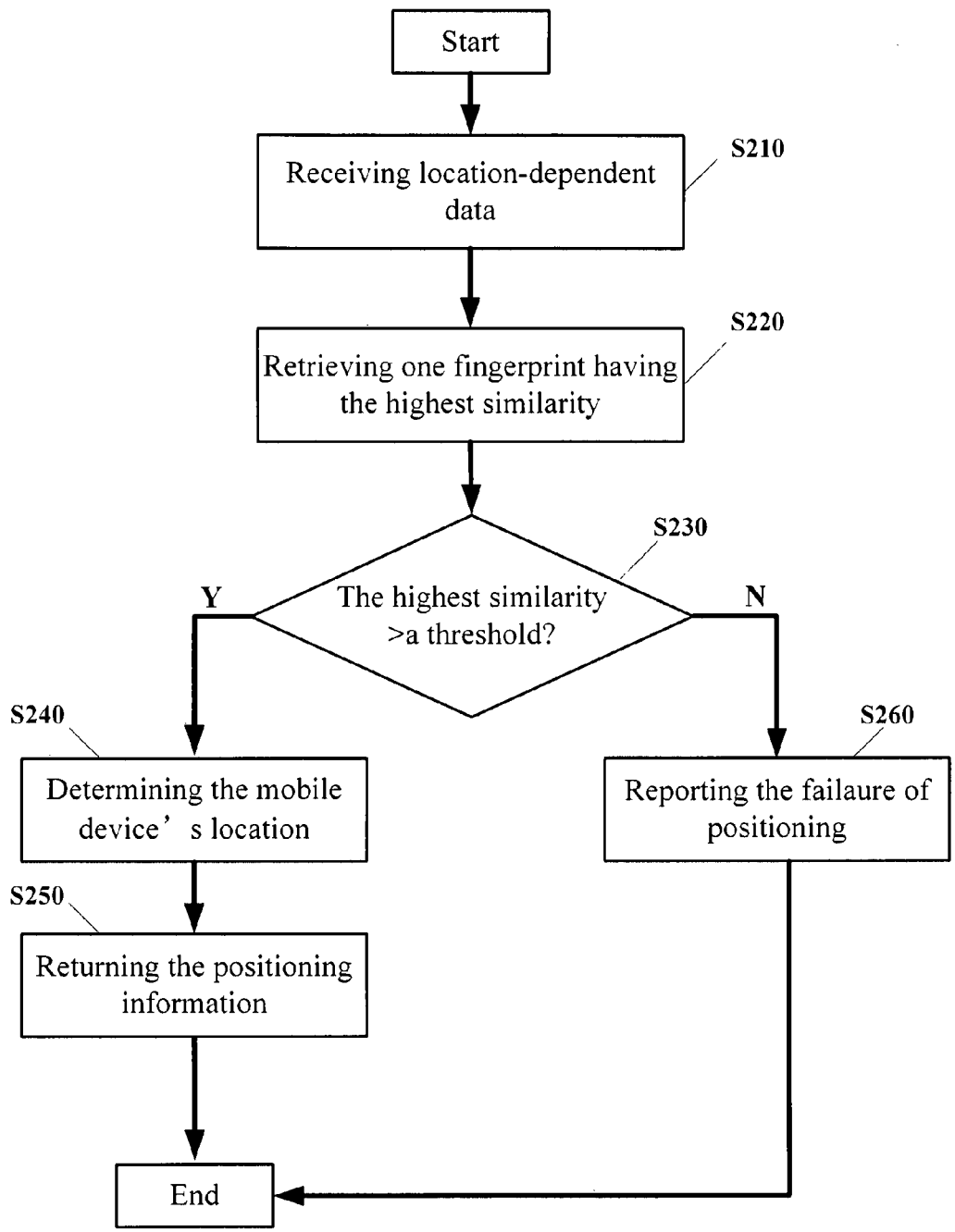
FIG. 2 is a flowchart illustrating method steps for positioning according to one exemplary embodiment of the present invention.

FIG. 2 is a flowchart illustrating method steps for positioning according to one exemplary embodiment of the present invention. For illustrative purpose, the positioning process is described in the scenario of the schematic cellular communication network as shown in FIG. 1, where the mobile device 200 sends a positioning request and the positioning node 110 carries out a positioning process in response to the request. However, it is understood that the present invention is applicable to any cellular communication network.

With reference to FIG. 2, at step S210, the positioning node 110 receives position information associated with the location of the mobile device 200 (also referred to as "location-dependent data" hereinafter). For example, the information may indicate one or more cells which the mobile device 200 hears or listens for at the current location, including a serving cell and/or possible neighbor cell (s), and/or their radio signal strength measured at the current location. Due to camp policy, handover policy, instability of signal strength measurement and the like, different serving cells may be assigned to one location at different times. In many cases, a list of the cells heard by the mobile device is more stable than the serving cell and thus is more appropriate for characterizing the radio environment or conditions. In one embodiment according to the present invention, both of the serving cell and the neighbor cell (s) are collectively referred to as "heard cell" or "heard cells".

Note that the position information may be either routed to the node 110 via one of the base stations 120A-120C, or has a direct path between the mobile device 200 and the node 110. In addition, the mobile device 200 may carry out the measurement on the signal strength or obtain the measurement from other devices.

In one embodiment of the present invention, the location-dependent data may be in form of a data set including a list of cells heard at the location where the mobile device 200 is.

As described above, in order to improve positioning accuracy, the signal strength of the heard cells can be added in the data set.

Then, at step S220, from a group of fingerprints corresponding to a plurality of locations within the cellular communication network as shown in FIG. 1, the positioning node 110 retrieves the best matching fingerprint, i.e., one having the highest similarity with the received location-dependent data. Note that the group may include all of the fingerprints stored in a reference map or database, or may be a reduced version to expedite the retrieval process. As a choice, the reduced version may be formed by selecting from the database those fingerprints having the predetermined serving cell identical to the serving cell of the list though the serving cell is changeable. The details on the retrieval step S220 will be described in the following embodiments with reference to FIGS. 3 and 4.

At step S230, the positioning node 110 compares the highest similarity with a predetermined threshold and if the comparison indicates that the former exceeds the latter, the process proceeds to step S240, where the location corresponding to the fingerprint with the highest similarity is determined as the location of the mobile device 200; otherwise, the process proceeds to step S260, where the positioning node 110 reports the failure of positioning to the mobile device 200 directly or via one of the base stations 120A-120C.

Referring to FIG. 2, after step S240, the process proceeds to step S250, where the positioning node 110 returns the positioning result to the mobile device 200 directly or via one of the base stations 120A-120C.

Note the best matching or the highest similarity herein does not mean that one fingerprint must be exactly identical to the location-dependent data. In other words, any insignificant difference there between is allowable and has no impact on the matching result. Such "fuzzy" match will substantially increase the matching rate, especially at the lower layers.

Figure 3:
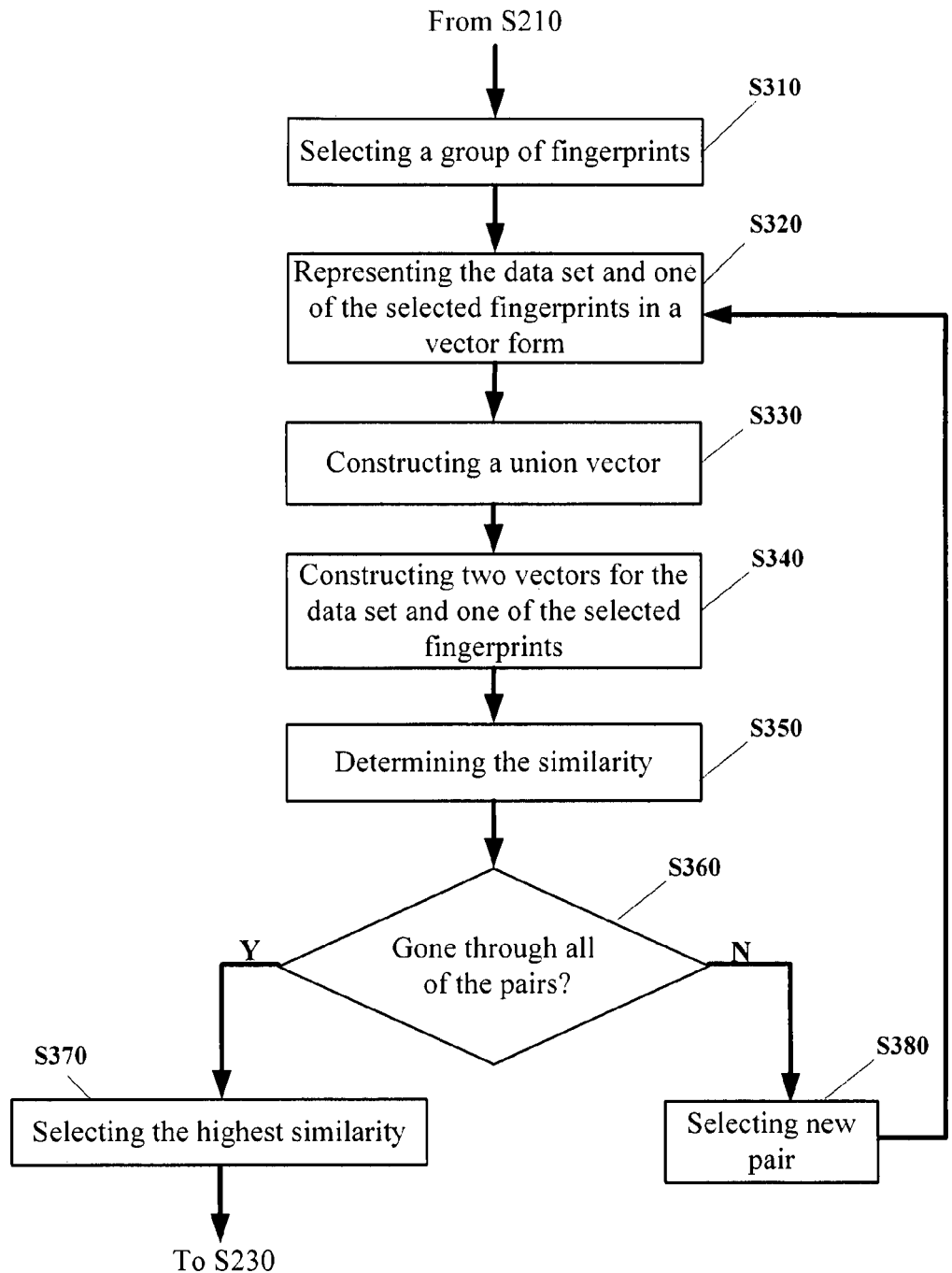
FIG. 3 is a flowchart illustrating an exemplary algorithm for the retrieval process.

FIG. 3 is a flowchart illustrating an exemplary algorithm for the retrieval process. For illustration, in this embodiment, the fingerprints are indexed with the Serving Cell ID in a reference database and have a hierarchical structure with Layers 1 and 2, and the retrieval process is performed at Layer 2. Additionally, the location-dependent data are in form of a data set including a list of cells heard at the location where the mobile device 200 is.

Referring to FIG. 3, at step S310, from the reference database, a group of fingerprints, e.g., having the predetermined serving cells identical to the serving cell of the list are selected. Although all of the fingerprints can be added into the group, a fast retrieval will benefit from this preselection.

The data set of the location-dependent data and anyone of the selected fingerprints can be joined to form a pair for determining a similarity. In other words, if the group has N fingerprints, N pairs are formed. In the following, steps S320 to S350 are carried out to determine the similarity of each pair.

Then, at step S320, the list of cells included in the data set and one of the selected fingerprints are represented in a vector form. A vector for the data set $V^p$ can be constructed as follows:

$$V^p = (N_1^P, N_2^P, \ldots, N_m^P, \ldots N_i^P) \quad (1)$$

where i corresponds to the number of the heard cells in the list, $N_m^P$ is the $m^{th}$ cell in the list.

As described above, the predetermined serving cell and the predetermined neighbor cell list included in one of the fingerprints can be merged into a single list corresponding to one of locations within a cellular coverage. Thus, a vector form, e.g., denoted as $V^t$, for one of the selected fingerprints, can be represented as follows:

$$V^t = (N_1^t, N_2^t, \ldots, N_n^P, \ldots N_j^t) \quad (2)$$

where j corresponds to the number of the cells in the merged list, $N_n^P$ is the $n^{th}$ cell in the merged list.

Note that the dimension of the above two vectors, i.e., i and j, may be not equal. In order to remove this "mismatch", the retrieval process proceeds to step S330, where a union vector $V^c$ is constructed as follows:

$$V^c = V^p \cup V^t = (N_1^c, N_2^c, \ldots, N_k^c, \ldots N_l^c) \quad (3)$$

where l corresponds to the number of the cells in the union vector and i+j≥l, $N_k^c$ s the $k^{th}$ cell in the union vector.

With the above union operation, the cells or elements in both of the vectors $V^p$ and $V^t$ are merged into the union vector $V^c$.

Then, at step S340, two vectors for the data set and one of the fingerprints, which have the same dimension l, are constructed as follows:

$$V^{c,p} = (N_1^{c,p}, N_2^{c,p}, \ldots, N_k^{c,p}, \ldots N_l^{c,p}) \quad N_k^{c,p} = \begin{cases} 1 & N_k^c \in V^p \\ 0 & N_k^c \notin V^p \end{cases} \quad (4)$$

$$V^{c,t} = (N_1^{c,t}, N_2^{c,t}, \ldots, N_k^{c,t}, \ldots N_l^{c,t}) \quad N_k^{c,t} = \begin{cases} 1 & N_k^c \in V^t \\ 0 & N_k^c \notin V^t \end{cases} \quad (5)$$

where $V^{c,p}$ is the vector for the data set and $V^{c,t}$ is the vector for one of the fingerprints, l corresponds to the number of the elements or cells in the vectors $V^{c,p}$ and $V^{c,t}$, $N_k^{c,p}$ is the $k^{th}$ elements in the vector $V^{c,p}$, and $N_k^{c,t}$ is the $k^{th}$ elements in the $V^{c,p}$.

Afterwards, at step S350, a similarity $Sim(V^p, V^t)$ between the data set and one of the fingerprints is determined as follows:

$$Sim(V^p, V^t) = \frac{\sum_{k=1}^{l} N_k^{c,p} N_k^{c,t}}{\sqrt{\sum_{k=1}^{l} (N_k^{c,p})^2} \sqrt{\sum_{k=1}^{l} (N_k^{c,t})^2}} \quad (6)$$

Note that in this embodiment, the similarity is relevant to an angle θ between two vectors or is represented as the cosine of the angle θ. However, since the similarity can be regarded as a measurement on coincidence or the state of two vectors occupying the same relative position or area in a multi-dimension vector space, other kinds of mathematics quantities are also available for characterizing the coincidence. For example, in one embodiment according to the present invention, the similarity is characterized by a Euclid distance between the vector for the data set and the vector for one of the fingerprints.

Then, at step S360, if it is determined that all of the pairs are gone through, i.e., the similarities for all of the pairs are obtained, then the process proceeds to step S370; otherwise, proceeding to step S380.

Next, at step S370, the maximum among the similarities for all of the pairs are selected as the highest similarity, which will be compared to a threshold at step S230 of FIG. 2.

For another branch, i.e., at step S380, a new pair is selected and then the process returns to step S320 so as to obtain the similarity for the new pair.

Figure 4:
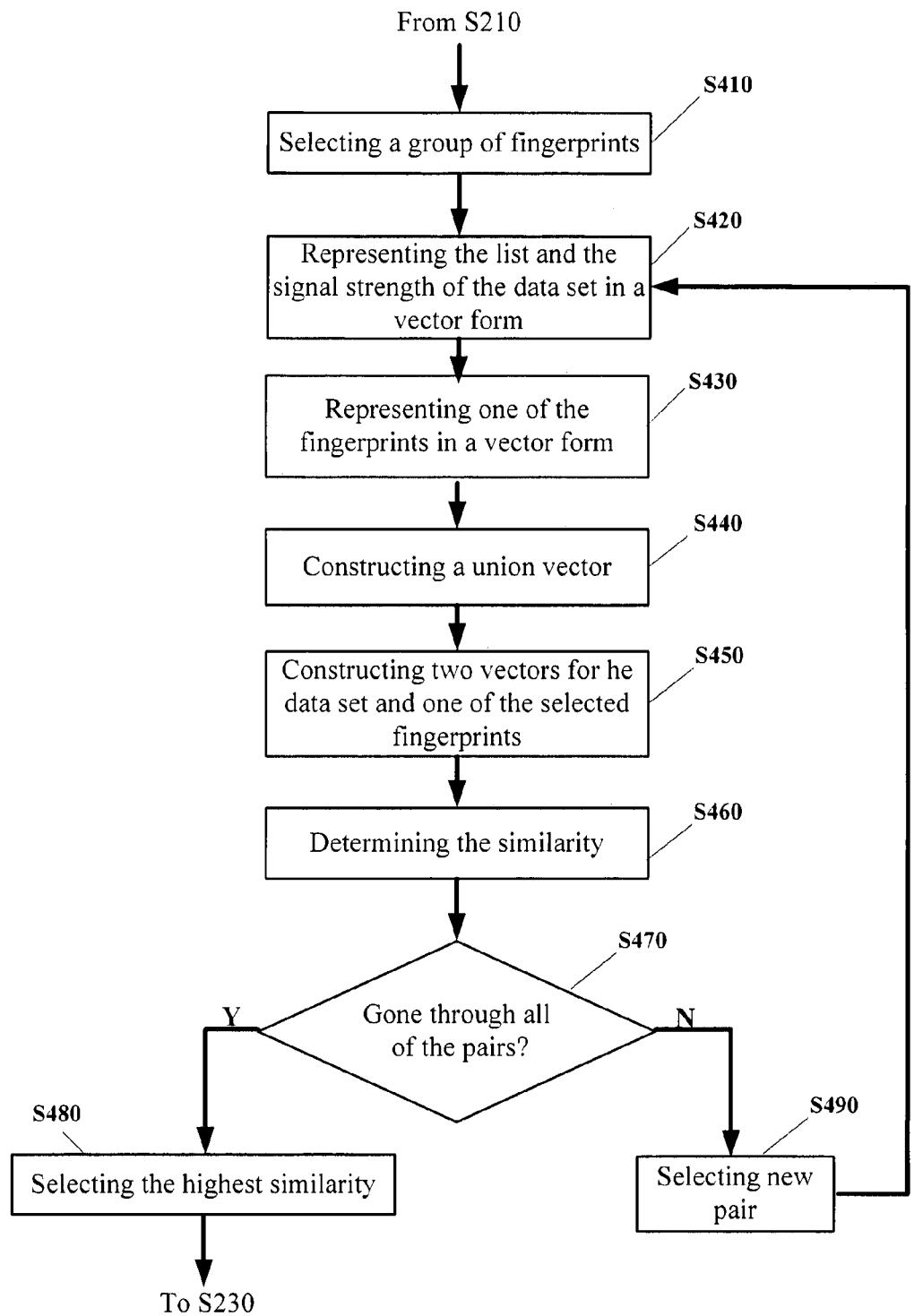
FIG. 4 is a flowchart illustrating another exemplary algorithm for the process.

FIG. 4 is a flowchart illustrating another exemplary algorithm for the retrieval process, where the cell list together with the radio signal strength are under consideration. For illustration, in this embodiment, the fingerprints are indexed with the Serving Cell ID in a reference database and have a hierarchical structure with Layers 1 to 3, and the retrieval process is performed at Layer 3. The location-dependent data are in form of a data set including a list of cells heard at the location where the mobile device 200 is and the signal strength of the heard cells in the list.

Referring to FIG. 4, at step S410, from the reference database, a group of fingerprints having the predetermined serving cells identical to the serving cell of the list are selected. Again, the data set and anyone of the selected fingerprints can be joined to form a pair for determining a similarity. In the following, steps S420 to S460 are carried out to determine the similarity of each pair.

Then, at step S420, the list of cells included in the data set and the signal strength of the cells in the list are represented in a vector form. A vector for the list $V^p$ can be constructed as follows:

$$V^p = (N_1^P, N_2^P, \ldots, N_m^P, \ldots N_i^P) \quad (7)$$

where i corresponds to the number of the heard cells in the list, $N_m^P$ is the $m^{th}$ cell in the list.

A vector for the signal strength of the cells in the list $S^p(V^p)$ can be constructed as follows:

$$S^p(V^p) = (S^p(N_1^P), S^p(N_2^P), \ldots, S^p(N_m^P), \ldots S^p(N_i^P)) \quad (8)$$

where i corresponds to the number of the heard cells in the list, $S^p(N_m^P)$ is the signal strength of the $m^{th}$ cell in the list. Note that in this embodiment, the signal strength $S^p(N_m^P)$ is represented in a discrete form.

Then, at step S430, one of the fingerprints in the group is represented in a vector form. As described above, the predetermined serving cell and the predetermined neighbor cell list included in one of the fingerprints can be merged into a single list corresponding to one of locations within a cellular coverage. Thus, a vector form, e.g., denoted as $V^t$, for one of the selected fingerprints, can be represented as follows:

$$V^t = (N_1^t, N_2^t, \ldots, N_n^P, \ldots N_j^t) \quad (9)$$

where j corresponds to the number of the cells in the merged list, $N_n^P$ is the $n^{th}$ cell in the merged list.

As for the signal strength of the cells in the merged list, its vector form can be represented as follows:

$$S^t = (S^t(N_1^t), S^t(N_2^t), \ldots, S^p(N_n^t), \ldots S^t(N_j^t)) \quad (10)$$

where j corresponds to the number of the cells in the merged list, $S^t(N_n^t)$ is the signal strength of the $n^{th}$ cell in the merged list represented in a discrete form.

As described above, the dimension of the above vectors, i.e., i and j, may be not equal. Thus, the retrieval process proceeds to step S440 to remove this "mismatch". At step S440, a union vector $V^c$ is constructed as follows:

$$V^c = V^p \cup V^t = (N_1^c, N_2^c, \ldots, N_k^c, \ldots N_l^c) \quad (11)$$

where l corresponds to the number of the cells in the union vector and i+j≥l, $N_k^c$ is the $k^{th}$ cell or elements in the union vector. With the above union operation, the cells or elements in both of the vectors $V^p$ and $V^t$ are merged into the union vector $V^c$.

Then, at step S450, two vectors for the data set and one of the fingerprints, which have the same dimension l, are constructed as follows:

$$V^{c,p} = (N_1^{c,p}, N_2^{c,p}, \ldots, N_k^{c,p}, \ldots N_l^{c,p}) \; N_k^{c,p} = \begin{cases} 1 & N_k^c \in V^p \\ 0 & N_k^c \notin V^p \end{cases} \quad (12)$$

$$V^{c,t} = (N_1^{c,t}, N_2^{c,t}, \ldots, N_k^{c,t}, \ldots N_l^{cc,t}) \; N_k^{c,t} = \\ \begin{cases} 0 & N_k^c \notin V^t \\ 1 & N_k^c \in V^t \text{ and } N_k^c \notin V^p \\ 0 & N_k^c \in V^t \text{ and } N_k^c \in V^p \text{ and } S^p(N_k^c) \neq S^t(N_k^c) \\ 1 & N_k^c \in V^t \text{ and } N_k^c \in V^p \text{ and } S^p(N_k^c) = S^t(N_k^c) \end{cases} \quad (13)$$

where $V^{c,p}$ is the vector for the data set and $V^{c,t}$ is the vector for one of the fingerprints, l corresponds to the number of the elements or cells in the vectors $V^{c,p}$ and $V^{c,t}$, $N_k^{c,p}$ is the $k^{th}$ elements in the vector $V^{c,p}$, and $N_k^{c,t}$ is the $k^{th}$ elements in the $V^{c,p}$.

As compared to the embodiment described with reference to FIG. 3, the signal strength of the respective cells is considered in the construction of the vectors $V^{c,p}$ and $V^{c,t}$.

Afterwards, at step S460, a similarity Sim($V^p$,$V^t$) between the data set and one of the fingerprints is determined as follows:

$$Sim(V^p, V^t) = \frac{\sum_{k=1}^{l} N_k^{c,p} N_k^{c,t}}{\sqrt{\sum_{k=1}^{l}(N_k^{c,p})^2} \sqrt{\sum_{k=1}^{l}(N_k^{c,t})^2}} \quad (14)$$

Again, although in this embodiment, the similarity is relevant to an angle θ between two vectors or is represented as the cosine of the angle θ, other kinds of mathematics quantities, such as a Euclid distance, are also available.

Then, at step S470, if it is determined that all of the pairs are gone through, i.e., the similarities for all of the pairs are obtained, then the process proceeds to step S480; otherwise, proceeding to step S490.

At step S480, the maximum among the similarities for all of the pairs are selected as the highest similarity, which will be compared to a threshold at step S230 of FIG. 2.

At step S490, a new pair is selected and then the process returns to step S420 so as to obtain the similarity for the new pair.

Figure 5:
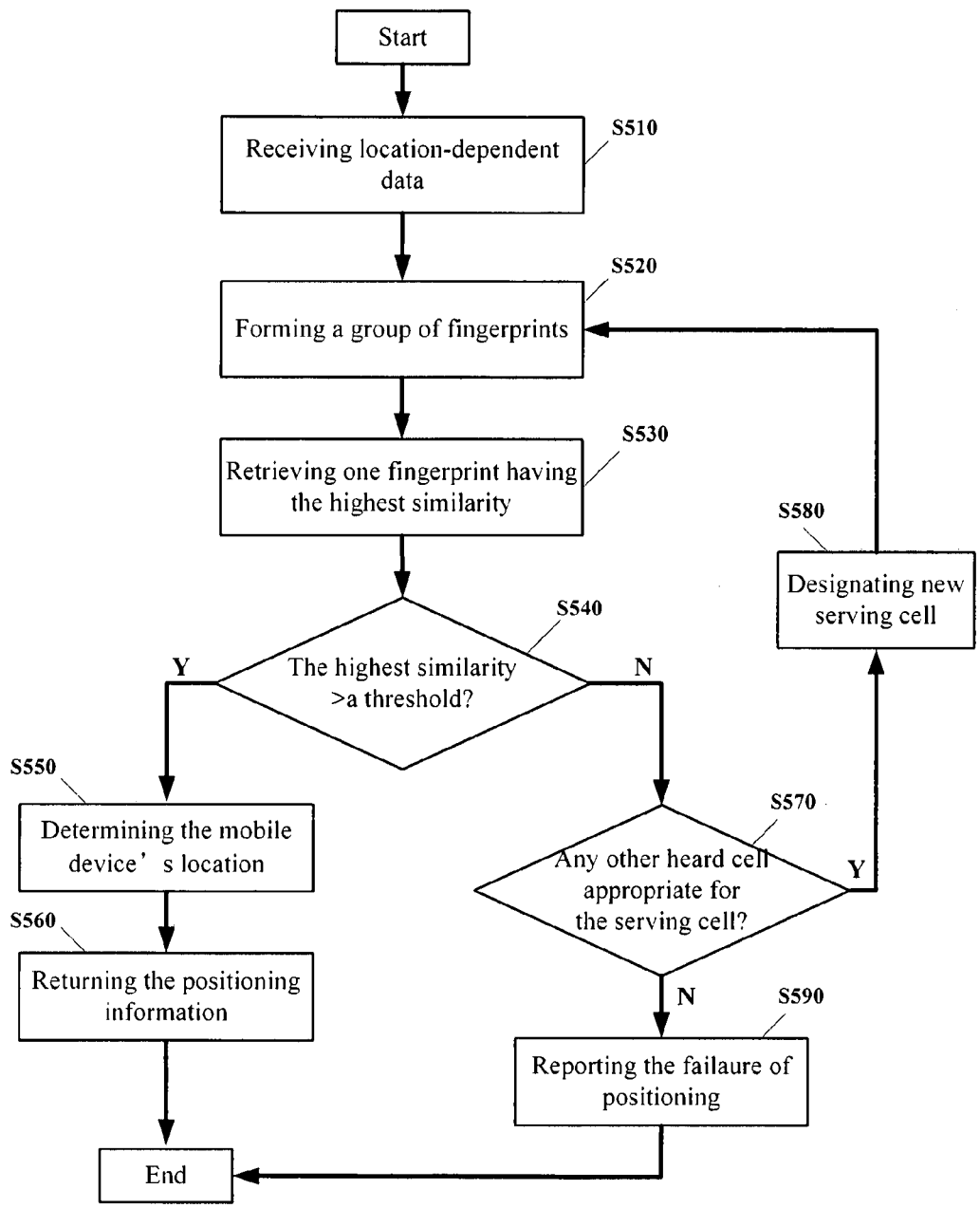
FIG. 5 is a flowchart illustrating method steps for positioning according to another exemplary embodiment of the present invention.

FIG. 5 is a flowchart illustrating method steps for positioning according to another exemplary embodiment of the present invention. Again, for illustrative purpose, the positioning process is described in the scenario of the schematic cellular communication network as shown in FIG. 1, where the mobile device 200 sends a positioning request and the positioning node 110 carry out a positioning process in response to the request.

As described above, the serving cell for one location is not fixed. However, in some cases, positioning results may significantly depend on the selection of the serving cell. Compared with the embodiments as described with reference to FIG. 2, this embodiment adopts a "switching" mechanism to eliminate or reduce such uncertainty, which is mainly embodied in steps S570 and S580.

With reference to FIG. 5, at step S510, the positioning node 110 receives, from the mobile device 200, a data set including a list of cells heard at the location where the mobile device 200 is and/or the radio signal strength of the heard cells measured at the current location.

Then, at step S520, the position node 110 selects, from a reference database, those fingerprints having the predetermined serving cells identical to the serving cell reported in the data set or the serving cell designated in step S580 so as to form a group of fingerprints.

At step S530, the positioning node 110 retrieves one having the highest similarity with the received data set. As described below, this step is probably repeated several times for a plurality groups, which are formed based on the different predetermined serving cells. The retrieval algorithm as described with reference to FIGS. 3 and 4 are also applicable in this step.

At step S540, the positioning node 110 determines whether the highest similarity exceeds a predetermined threshold and if it is the case, the process proceeds to step S550; otherwise, the process proceeds to step S570.

At step S550, the positioning node 110 determines the location corresponding to the fingerprint with the highest similarity as the location of the mobile device 200.

Then proceeding to step S560, the positioning node 110 returns the positioning result to the mobile device 200 directly or via one of the base stations 120A-120C.

As for another branch, i.e., at step S570, the positioning node 110 make a judgment on whether there exists any other heard cell in the list appropriate for the serving cell. For example, it may provide that all of the neighbor cells are qualified as the serving cell. As a result, if there exists any "blank" heard cell, i.e., one that has not been designated as the serving cell for forming the group in step S520, then the positioning node 110 will judge that the retrieval step S530 shall be applied to other possible group(s), and the process proceeds to step S580; otherwise, the process proceeds to step S590, where the positioning node 110 reports the failure of positioning to the mobile device 200 directly or via one of the base stations 120A-120C.

Note that at step S570, other criteria are available for the judgment. For example, the neighbor cells having the top N strongest signal strength may be qualified as the serving cell.

At step S580, the positioning node 110 designates one of the blank heard cells as the serving cell and then the process returns to step S520.

Figure 6:
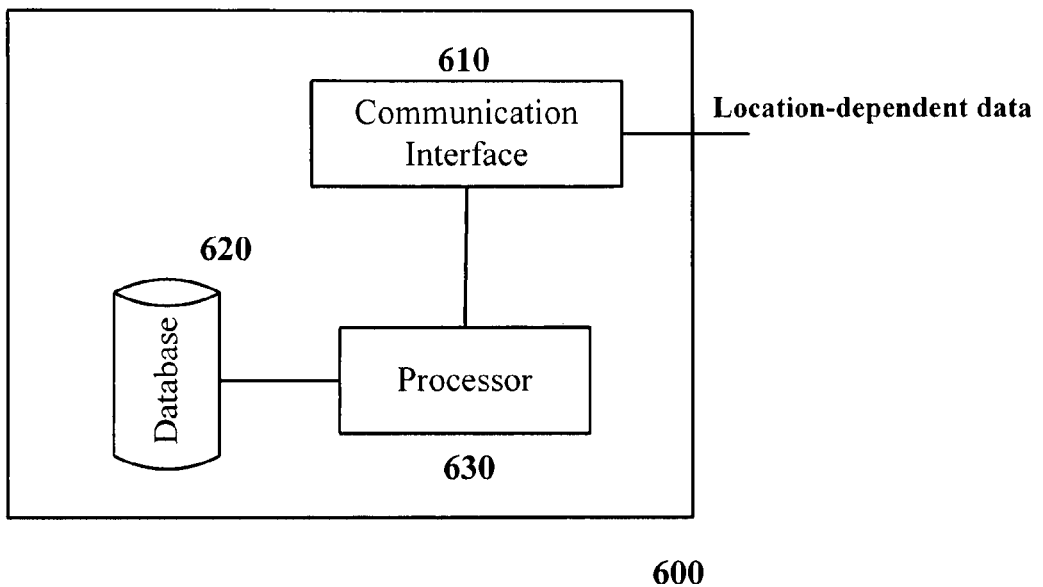
FIG. 6 is a block diagram illustrating one embodiment of an apparatus for positioning according to the present invention.

FIG. 6 is a block diagram illustrating one embodiment of an apparatus for positioning according to the present invention.

For illustrative purpose, the apparatus as shown in FIG. 6 is deployed within the positioning node 110 of the schematic cellular communication network as shown in FIG. 1. However, it shall be understood that such arrangement is non-limited, and indeed this apparatus may be deployed anywhere, e.g., a place outside the coverage of the cellular communication network. Furthermore, the apparatus may be a dedicated equipment for positioning or may be one designed for multi-task including positioning.

With reference to FIG. 6, the apparatus for positioning 600 comprises a communication interface 610, a database 620, and a processor 630, which is coupled to the communication interface 610 and the database 620.

The communication interface 610 receives location-dependent data regarding the mobile device 200, e.g., via one of the base stations 120A-120C, or from the mobile device 200 directly. In one embodiment of the present invention, the location-dependent data are encapsulated in frames transmitted to the communication interface 610.

The database 620 stores fingerprints for characterizing the radio conditions at the locations within the cellular coverage. In one embodiment according to the present invention, anyone of the fingerprints may include the following characteristics: the predetermined serving cell at one location, the predetermined neighbor cell list at that location, and the signal strength of the predetermined serving cell and the cells in the predetermined neighbor cell list. Again, the fingerprints may be indexed with the serving cell and have a hierarchical structure.

The processor 630 receives the frames from the communication interface 610 and thus extracts the location-dependent data. Then, the processor 630 retrieves the best matching fingerprint or one having the highest similarity for the location-dependent data from the database 620, and generates positioning result by determining the location corresponding to the best matching fingerprint as the mobile device's location if its similarity exceeds a predetermined threshold. In turn, the processor 630 returns the positioning result to the mobile device 200 via the communication interface 610. In one embodiment of the present invention, the processor 630 carries out the above operations in those manners as described in the embodiments with reference to FIGS. 2 to 5.

Figure 7:
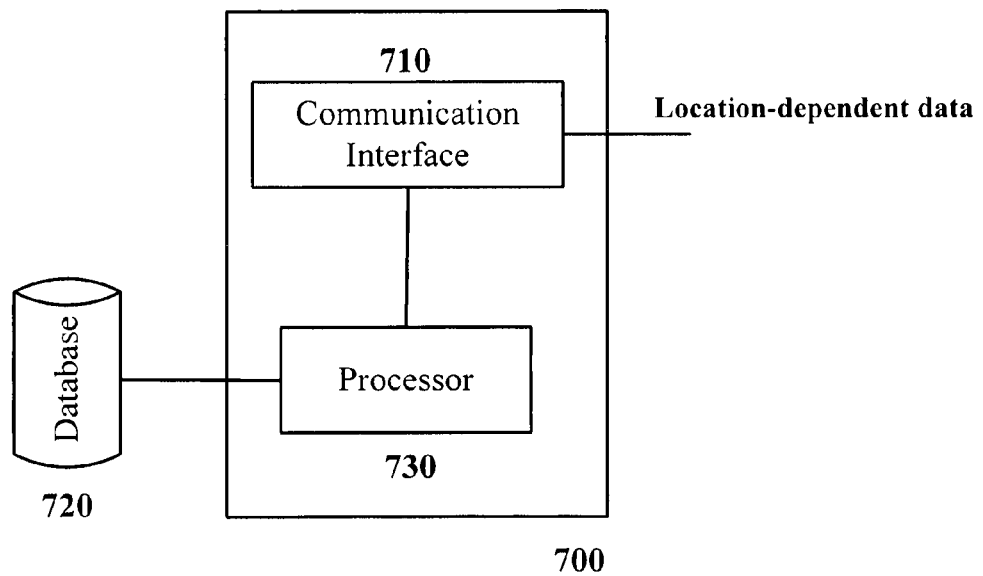
FIG. 7 is a block diagram illustrating another embodiment of an apparatus for positioning according to the present invention.

FIG. 7 is a block diagram illustrating another embodiment of an apparatus for positioning according to the present invention.

With reference to FIG. 7, the apparatus for positioning 700 comprises a communication interface 710 and a processor 730. In this embodiment, the processor 730 can access to a database 720 external to the apparatus 700, which also stores fingerprints for characterizing the radio conditions at the locations within the cellular coverage.

The communication interface 710 forwards location-dependent data regarding the mobile device 200 to the processor 730. In turn, the processor 730 retrieves the best matching fingerprint for the location-dependent data from the external database 720, and generates positioning information, which is returned to the mobile device 200 via the communication interface 710. Again, the processor 730 may carry out the above operations in those manners as described in the embodiments with reference to FIGS. 2 to 5.

According to one embodiment of the present invention, it provides a computer program product adapted to carry out the methods as described above when run on a computer.

According to another embodiment of the present invention, it provides a computer readable medium comprising computer executable program code adapted to carry out the steps of anyone of the methods as described above.

It should be noted that the aforesaid embodiments are illustrative of this invention instead of restricting this invention, substitute embodiments may be designed by those skilled in the art without departing from the scope Of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for positioning in a communication network with a cellular coverage, comprising steps of:
    a communication interface receiving location-dependent data concerning a mobile device;
    a processor forming a plurality of pairs, wherein each pair corresponds to a pairing of each of a plurality of fingerprints with the location-dependent data, and wherein each of the plurality of fingerprints corresponds to one of locations within the cellular coverage;
    the processor determining similarities for the plurality of pairs; and
    the processor determining a location corresponding to a fingerprint included in a pair having a highest similarity which is a maximum similarity among the determined similarities for the plurality of pairs, as a location of the mobile device if the highest similarity exceeds a predetermined threshold, wherein the similarity is a measurement of coincidence between a vector corresponding to at least signal strength of cells heard at the mobile device and a vector corresponding to one of the plurality of fingerprints.

2. The method according to claim 1, wherein the location-dependent data includes a list of cells heard at the mobile device or signal strength of the heard cells obtained at the mobile device, and each of the plurality of fingerprints includes a list of one or more cells corresponding to one of the locations within the cellular coverage or signal strength of the heard cells in the list obtained at one of the locations.

3. The method according claim 1, wherein the location-dependent data and the plurality of fingerprints are represented in a multi-dimension vector space, and the similarity is a measurement on coincidence between a vector for the location-dependent data including the signal strength of the cells heard at the mobile device, and a vector for one of the fingerprints.

4. The method according to claim 3, wherein the vector for the location-dependent data and the vector for one of the fingerprints are constructed as follows:

$$V^{c,p} = (N_1^{c,p}, N_2^{c,p}, \ldots, N_k^{c,p}, \ldots N_l^{c,p}) \; N_k^{c,p} = \begin{cases} 1 & N_k^c \in V^p \\ 0 & N_K^c \notin V^p \end{cases}$$

$$V^{c,t} = (N_1^{c,t}, N_2^{c,t}, \ldots, N_k^{c,t}, \ldots N_l^{c,t}) \; N_k^{c,t} = \begin{cases} 1 & N_k^c \in V^t \\ 0 & N_K^c \notin V^t \end{cases}$$

$$V^c = V^p \cup V^t = (N_1^c, N_2^c, \ldots, N_k^c, \ldots N_l^c)$$

$$V^p = (N_1^p, N_2^p, \ldots, N_m^p, \ldots N_i^p)$$

$$V^t = (N_1^t, N_2^t, \ldots, N_n^p, \ldots N_j^t)$$

where $V_t^c$ and $V_p^c$ are the vector for the location-dependent data and the vector for one of the fingerprints respectively, $N_k^{c,p}$ and $N_k^{c,t}$ are $k^{th}$ elements in the respective vectors, and $V^p$ is a vector representation for the location-dependent data and $V^t$ is a vector representation for one of the fingerprints, $N_m^p$ is a $m^{th}$ cell in the list of cells heard at the mobile device and $N_n^t$ is a $n^{th}$ cell in the list of cells corresponding to one of the locations, i, j and l are positive integers.

5. The method according to claim 3, wherein the vector for the location-dependent data and the vector for one of the fingerprints are constructed as follows:

$$V^{c,p} = (N_1^{c,p}, N_2^{c,p}, \ldots, N_k^{c,p}, \ldots N_l^{c,p}) \; N_k^{c,p} = \begin{cases} 1 & N_k^c \in V^p \\ 0 & N_K^c \notin V^p \end{cases}$$

$$V^{c,t} = (N_1^{c,t}, N_2^{c,t}, \ldots, N_k^{c,t}, \ldots N_l^{c,t}) \; N_k^{c,t} = \begin{cases} 0 & N_k^c \in V^t \\ 1 & N_k^c \in V^t \text{ and } N_k^c \notin V^p \\ 0 & N_k^c \in V^t \text{ and } N_k^c \in V^p \text{ and } S^p(N_k^c) \neq S^t(N_k^c) \\ 1 & N_k^c \in V^t \text{ and } N_k^c \in V^p \text{ and } S^p(N_k^c) = S^t(N_k^c) \end{cases}$$

$$V^c = V^p \cup V^t = (N_1^c, N_2^c, \ldots, N_k^c, \ldots N_l^c)$$

$$V^p = (N_1^p, N_2^p, \ldots, N_m^p, \ldots N_i^p)$$

$$V^t = (N_1^t, N_2^t, \ldots, N_n^p, \ldots N_j^t)$$

$$S^p(V^p) = (S^p(N_1^p), S^p(N_2^p), \ldots, S^p(N_m^p), \ldots, S^p(N_i^p))$$

$$S^t(V^t) = (S^t(N_1^t), S^t(N_2^t), \ldots, S^p(N_n^t), \ldots, S^t(N_j^t))$$

where $V_t^c$ and $V_p^c$ are the vector for the location-dependent data and the vector for one of the fingerprints respectively, $N_k^{c,p}$ and $N_k^{c,t}$ are $k^{th}$ elements in the respective vectors, and $V^p$ is a vector representation for the location-dependent data and $V^t$ is a vector representation for one of the fingerprints, $N_m^p$ is a $m^{th}$ cell in the list of cells heard at the mobile device and $N_n^t$ is a $n^{th}$ cell in the list of cells corresponding to one of the locations, $S^p(N_m^p)$ is a discrete representation of a signal strength of the $m^{th}$ cell in the list of cells heard at the mobile device and $S^t(N_m^t)$ is a discrete representation of a signal strength of the $n^{th}$ cell in the list of cells corresponding to one of the locations, i, j and l are positive integers.

6. The method according to claim 4, wherein the measurement on coincidence is characterized by an angle or a Euclid distance between the vector for the signal strength of cells heard at the mobile device and the vector for one of the plurality of fingerprints.

7. An apparatus for positioning in a communication network with a cellular coverage, comprising:
    a communication interface to receive location-dependent data concerning a mobile device;
    a database to store a plurality of fingerprints, each of which corresponds to one of locations within the cellular coverage; and
    a processor configured to:
        form a plurality of pairs, wherein each pair corresponds to a pairing of each of a plurality of fingerprints with the location-dependent data,
        determine similarities for the plurality of pairs,
        determine a location corresponding to a fingerprint included in a pair having a highest similarity which is a maximum similarity among the determined similarities for the plurality of pairs, as a location of the mobile device if the highest similarity exceeds a predetermined threshold, wherein the similarity is a measurement of coincidence between a vector corresponding to at least a signal strength of cells heard at the mobile device and a vector corresponding to one of the plurality fingerprints.

8. The apparatus according to claim 7, wherein the location-dependent data includes a list of cells heard at the mobile device or signal strength of the heard cells obtained at the mobile device, and each of the plurality of fingerprints includes a list of one or more cells corresponding to one of the locations within the cellular coverage and/or signal strength of the cells in the list obtained at one of the locations.

9. The apparatus according to claim 8, wherein the location-dependent data and the plurality of fingerprints are represented in a multi-dimension vector space, and the similarity is a measurement on coincidence between a vector for the location-dependent data including the signal strength of the cells heard at the mobile device and a vector for one of the fingerprints.

10. The apparatus according to claim 9, wherein the vector for the location-dependent data and the vector for one of the fingerprints are constructed as follows:

$$V^{c,p} = (N_1^{c,p}, N_2^{c,p}, \ldots, N_k^{c,p}, \ldots N_l^{c,p}) \ N_k^{c,p} = \begin{cases} 1 & N_k^c \in V^p \\ 0 & N_k^c \notin V^p \end{cases}$$

$$V^{c,t} = (N_1^{c,t}, N_2^{c,t}, \ldots, N_k^{c,t}, \ldots N_l^{c,t}) \ N_k^{c,t} = \begin{cases} 1 & N_k^c \in V^t \\ 0 & N_k^c \notin V^t \end{cases}$$

$$V^c = V^p \cup V^t = (N_1^c, N_2^c, \ldots, N_k^c, \ldots N_l^c)$$

$$V^p = (N_1^p, N_2^p, \ldots, N_m^p, \ldots N_i^p)$$

$$V^t = (N_1^t, N_2^t, \ldots, N_n^p, \ldots N_j^t)$$

where $V_t^c$ and $V_p^c$ are the vector for the location-dependent data and the vector for one of the fingerprints respectively, $N_k^{c,p}$ and $N_k^{c,t}$ are $k^{th}$ elements in the respective vectors, and $V^p$ is a vector representation for the location-dependent data and $V^t$ is a vector representation for one of the fingerprints, $N_m^p$ is a $m^{th}$ cell in the list of cells heard at the mobile device and $N_n^t$ is a $n^{th}$ cell in the list of cells corresponding to one of the locations, i, j and l are positive integers.

11. The apparatus according to claim 9, wherein the vector for the location-dependent data and the vector for one of the fingerprints are constructed as follows:

$$V^{c,p} = (N_1^{c,p}, N_2^{c,p}, \ldots, N_k^{c,p}, \ldots N_l^{c,p}) \ N_k^{c,p} = \begin{cases} 1 & N_k^c \in V^p \\ 0 & N_k^c \notin V^p \end{cases}$$

$$V^{c,t} = (N_1^{c,t}, N_2^{c,t}, \ldots, N_k^{c,t}, \ldots N_l^{c,t}) \ N_k^{c,t} =$$

$$\begin{cases} 0 & N_k^c \in V^t \\ 1 & N_k^c \in V^t \text{ and } N_k^c \notin V^p \\ 0 & N_k^c \in V^t \text{ and } N_k^c \in V^p \text{ and } S^p(N_k^c) \neq S^t(N_k^c) \\ 1 & N_k^c \in V^t \text{ and } N_k^c \in V^p \text{ and } S^p(N_k^c) = S^t(N_k^c) \end{cases}$$

$$V^c = V^p \cup V^t = (N_1^c, N_2^c, \ldots, N_k^c, \ldots N_k^c, \ldots N_l^c)$$

$$V^p = (N_1^p, N_2^p, \ldots, N_m^p, \ldots N_i^p)$$

$$V^t = (N_1^t, N_2^t, \ldots, N_n^p, \ldots N_j^t)$$

$$S^p(V^p) = (S^p(N_1^p), S^p(N_2^p), \ldots, S^p(N_m^p), \ldots, S^p(N_i^p))$$

$$S^t(V^t) = (S^t(N_1^t), S^t(N_2^t), \ldots, S^p(N_n^t), \ldots, S^t(N_j^t))$$

where $V_t^c$ and $V_p^c$ are the vector for the location-dependent data and the vector for one of the fingerprints respectively, $N_k^{c,p}$ and $N_k^{c,t}$ are $k^{th}$ elements in the respective vectors, and $V^p$ is a vector representation for the location-dependent data and $V^t$ is a vector representation for one of the fingerprints, $N_m^p$ is a $m^{th}$ cell in the list of cells heard at the mobile device and $N_n^t$ is a $n^{th}$ cell in the list of cells corresponding to one of the locations, $S^p(N_m^p)$ is a discrete representation of a signal strength of the $m^{th}$ cell in the list of cells heard at the mobile device and $S^t(N_m^t)$ is a discrete representation of a signal strength of the $n^{th}$ cell in the list of cells corresponding to one of the locations, i, j and l are positive integers.

12. The apparatus according to claim 11, wherein the measurement on coincidence is characterized by an angle or a Euclid distance between the vector for the signal strength of cells heard at the mobile device and the vector for one of the plurality of fingerprints.

13. The apparatus according to claim 7, wherein the communication network is selected from a group consisting of GSM system, WCDMA system, CDMA2000 system and TD-CDMA system.

14. An apparatus for positioning in a communication network with a cellular coverage, comprising:
a communication interface to receive location-dependent data concerning a mobile device; and
a processor forming a plurality of pairs, each of which corresponds to a pairing of each of a plurality of fingerprints with the location-dependent data, and wherein each of the plurality of fingerprints corresponds to one of locations within the cellular coverage, wherein the processor is further configured to determine similarities for the plurality of pairs, and wherein the processor is further configured to determine a location corresponding to a fingerprint included in a pair having a highest similarity which is a maximum similarity among the determined similarities for the plurality of pairs, as a location of the mobile device if the highest similarity exceeds a predetermined threshold, wherein the similarity is a measurement of coincidence between a vector corresponding to at least a signal strength of cells heard at the mobile device and a vector corresponding to one of the plurality of fingerprints, and wherein the processor is further configured to access a database for selecting the plurality of fingerprints.

15. A non-transitory computer-readable medium having instructions stored therein, the instructions when executed by a computer, cause the computer to perform a method, the method comprising:
receiving location-dependent data concerning a mobile device;
forming a plurality of pairs, wherein each pair corresponds to a pairing of each of a plurality of fingerprints with the location-dependent data, and wherein each of the plurality of fingerprints corresponds to one of locations within the cellular coverage;
determining similarities for the plurality of pairs; and
determining a location corresponding to a fingerprint included in a pair having a highest similarity which is a maximum similarity among the determined similarities for the plurality of pairs, as a location of the mobile device if the highest similarity exceeds a predetermined threshold, wherein the similarity is a measurement of coincidence between a vector corresponding to at least signal strength of cells heard at the mobile device and a vector corresponding to one of the plurality of fingerprints.

16. The non-transitory computer-readable medium according to claim 15, wherein the location-dependent data includes a list of cells heard at the mobile device or signal strength of the heard cells obtained at the mobile device, and each of the plurality of fingerprints includes a list of one or more cells corresponding to one of the locations within the cellular coverage or signal strength of the heard cells in the list obtained at one of the locations.

17. The non-transitory computer-readable medium according claim 15, wherein the location-dependent data and the plurality of fingerprints are represented in a multi-dimension vector space, and the similarity is a measurement on coincidence between a vector for the location-dependent data including the signal strength of the cells heard at the mobile device and a vector for one of the fingerprints.

18. The non-transitory computer-readable medium according to claim 17, wherein the vector for the location-dependent data and the vector for one of the fingerprints are constructed as follows:

$$V^{c,p} = (N_1^{c,p}, N_2^{c,p}, \ldots, N_k^{c,p}, \ldots N_l^{c,p}) \quad N_k^{c,p} = \begin{cases} 1 & N_k^c \in V^p \\ 0 & N_K^c \notin V^p \end{cases}$$

$$V^{c,t} = (N_1^{c,t}, N_2^{c,t}, \ldots, N_k^{c,t}, \ldots N_l^{c,t}) \quad N_k^{c,t} = \begin{cases} 1 & N_k^c \in V^t \\ 0 & N_K^c \notin V^t \end{cases}$$

$$V^c = V^p \cup V^t = (N_1^c, N_2^c, \ldots, N_k^c, \ldots N_k^c, \ldots N_l^c)$$

$$V^p = (N_1^p, N_2^p, \ldots, N_m^p, \ldots N_l^p)$$

$$V^t = (N_1^t, N_2^t, \ldots, N_n^p, \ldots N_j^t)$$

where $V_t^c$ and $V_p^c$ are the vector for the location-dependent data and the vector for one of the fingerprints respectively, $N_k^{c,p}$ and $N_k^{c,t}$ are $k^{th}$ elements in the respective vectors, and $V^p$ is a vector representation for the location-dependent data and $V^t$ is a vector representation for one of the fingerprints, $N_m^p$ is a $m^{th}$ cell in the list of cells heard at the mobile device and $N_n^t$ is a $n^{th}$ cell in the list of cells corresponding to one of the locations, i, j and l are positive integers.

19. The non-transitory computer-readable medium according to claim 17, wherein the vector for the location-dependent data and the vector for one of the fingerprints are constructed as follows:

$$V^{c,p} = (N_1^{c,p}, N_2^{c,p}, \ldots, N_k^{c,p}, \ldots N_l^{c,p}) \quad N_k^{c,p} = \begin{cases} 1 & N_k^c \in V^p \\ 0 & N_K^c \notin V^p \end{cases}$$

$$V^{c,t} = (N_1^{c,t}, N_2^{c,t}, \ldots, N_k^{c,t}, \ldots N_l^{c,t}) \quad N_k^{c,t} = \begin{cases} 0 & N_k^c \notin V^t \\ 1 & N_k^c \in V^t \text{ and } N_k^c \notin V^p \\ 0 & N_k^c \in V^t \text{ and } N_k^c \in V^p \text{ and } S^p(N_k^c) \neq S^t(N_k^c) \\ 1 & N_k^c \in V^t \text{ and } N_k^c \in V^p \text{ and } S^p(N_k^c) = S^t(N_k^c) \end{cases}$$

$$V^c = V^p \cup V^t = (N_1^c, N_2^c, \ldots, N_k^c, \ldots N_k^c, \ldots N_l^c)$$

$$V^p = (N_1^p, N_2^p, \ldots, N_m^p, \ldots N_l^p)$$

$$V^t = (N_1^t, N_2^t, \ldots, N_n^p, \ldots N_j^t)$$

$$S^p(V^p) = (S^p(N_1^p), S^p(N_2^p), \ldots, S^p(N_m^p), \ldots, S^p(N_l^p))$$

$$S^t(V^t) = (S^t(N_1^t), S^t(N_2^t), \ldots, S^p(N_n^t), \ldots, S^t(N_j^t))$$

where $V_t^c$ and $V_p^c$ are the vector for the location-dependent data and the vector for one of the fingerprints respectively, $N_k^{c,p}$ and $N_k^{c,t}$ are $k^{th}$ elements in the respective vectors, and $V^p$ is a vector representation for the location-dependent data and $V^t$ is a vector representation for one of the fingerprints, $N_m^p$ is a $m^{th}$ cell in the list of cells heard at the mobile device and $N_n^t$ is a $n^{th}$ cell in the list of cells corresponding to one of the locations, $S^p(N_m^p)$ is a discrete representation of a signal strength of the $m^{th}$ cell in the list of cells heard at the mobile device and $S^t(N_m^t)$ is a discrete representation of a signal strength of the $n^{th}$ cell in the list of cells corresponding to one of the locations, i, j and l are positive integers.

20. The non-transitory computer-readable medium according to claim 19, wherein the measurement on coincidence is characterized by an angle or a Euclid distance between the vector for the location-dependent data and the vector for one of the plurality of fingerprints.

* * * * *